Oct. 13, 1953

C. A. BROWN
MULTIPLE GASEOUS FUEL BURNER AND
SECONDARY AIR FEED BAFFLE
Original Filed Dec. 22, 1945

Re. 23,721

INVENTOR:
Charles A. Brown,
BY Carr Chen & Gravely,
HIS ATTORNEYS.

Reissued Oct. 13, 1953

Re. 23,721

UNITED STATES PATENT OFFICE 23,721

MULTIPLE GASEOUS FUEL BURNER AND SECONDARY AIR FEED BAFFLE

Charles A. Brown, St. Louis County, Mo., assignor, by mesne assignments, to International Oil Burner Company, St. Louis, Mo., a corporation of Missouri Original No. 2,547,850, dated April 3, 1951, Serial No. 636,711, December 22, 1945. Application for reissue November 29, 1951, Serial No. 258,841

6 Claims. (Cl. 158—104)

Matter enclosed in heavy brackets [ ] appears in the original patent but forms no part of this reissue specification; matter printed in italics indicates the additions made by reissue.

This invention relates to multiple gaseous fuel burners of the kind comprising a plurality of upright Bunsen type burner units adapted for assemblage in an annular series or other order of relation in a domestic furnace or other heater. The invention has for its principal object to provide a gaseous fuel burner of the above type with means for directing an adequate supply of secondary air along opposite sides of the burner flames without re-circulation of combustion products around the flames and without impingement of the flames on said means or on the furnace parts, thereby providing complete combustion of the gas and eliminating dangerous carbon monoxide gases. Other objects are simplicity and economy of construction and compactness of design. The invention consists in the multiple gaseous fuel burner, in the individual burner unit and in the parts and combinations and arrangements of parts hereinafter described and claimed.

Figure 1:
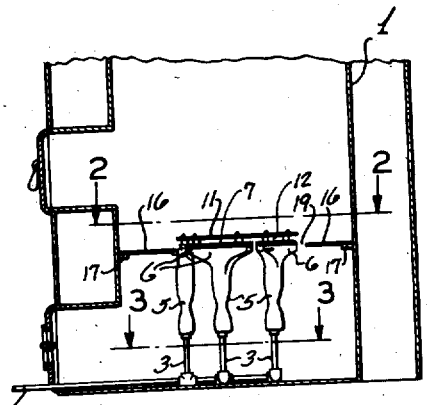
Figure 2:
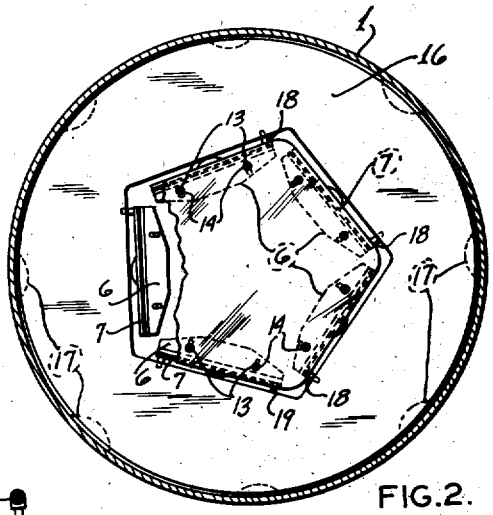
Figure 3:
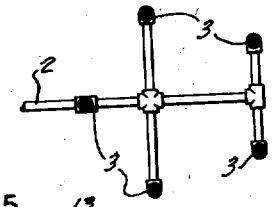
Figure 4:
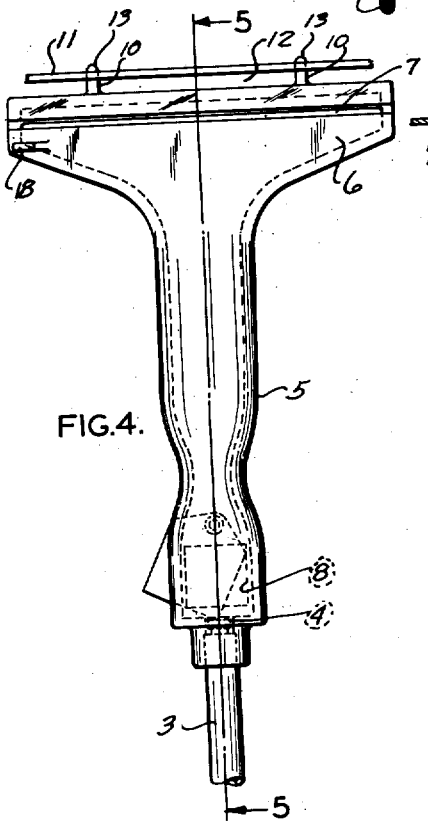
Figure 5:
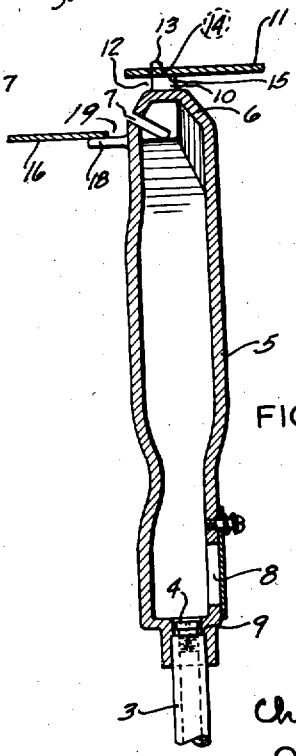

In the accompanying drawing, which forms part of this specification and wherein like symbols refer to like parts wherever they occur, Fig. 1 is a vertical sectional view through the lower portion of a domestic furnace provided with a multiple gaseous fuel burner embodying my invention, Figs. 2 and 3 are enlarged horizontal cross-sectional views on the lines 2—2 and 3—3, respectively, in Fig. 1, Fig. 4 is an outside elevational view of one of the burner units; and Fig. 5 is a central vertical sectional view on the line 5—5 in Fig. 4.

In the accompanying drawing, my multiple gaseous fuel burner is shown mounted in an ordinary domestic heating furnace 1 and is supplied with gaseous fuel from a supply pipe 2 that extends horizontally into said furnace along the bottom thereof and terminates in an annular series of upright branch pipes 3 provided at their upper ends with suitable jet fittings or nozzles 4. Supported on the upper ends of the supply pipe branches 3 are Bunsen type burner units comprising upright tubular body portions 5 that terminate at their upper ends in horizontally elongated hollow heads 6 that are arranged in a circle and have narrow discharge openings 7 that extend from end to end thereof along the outer sides thereof and are inclined upwardly and outwardly at about an angle of 35 degrees above the horizontal. The upright tubular body portions 5 of the burner units have primary air inlet openings 8 in their inner side walls near their lower ends. These primary air inlet openings are provided with pivoted valve plates for controlling the amount of air passing through said openings into said tubular body portions. The lower ends of the bores of the tubular body portions 5 of the burner units are counterbored to fit the upper ends of the upright supply pipe branches 3 and to provide annular shoulders 9 that seat on said ends of said branches.

As shown in the drawing, the burner units are mounted on upright fuel supply pipe branches 3 with their heads 6 arranged in a circle and spaced inwardly from the vertical side wall of the furnace 1 and with delivery slots or openings 7 in said heads facing outwardly and with the primary air inlet openings 8 at the lower ends of said upright tubular body portions 5 of said burner units facing inwardly. Supported on upstanding lugs 10 provided therefor on the tops of the heads 6 of the burner units is a deflector plate 11 which covers the space between said burner units and is spaced a suitable distance above the burner heads to provide horizontal secondary air passages 12 between said plate and said burner heads. As shown in the drawing, the central deflector plate 11, is shaped to bring the peripheral edge thereof in substantially flush alinement with the outer sides of the burner heads 6; and the lugs 10 on said heads have reduced upper end portions 13 that fit within vertical holes 14 provided therefor in said plate and form horizontal seats 15 for spacing said plate above said burner heads. Mounted in the furnace 1 between the side wall thereof and the heads 6 of the circular series of burner units is an annular deflector plate 16 which is supported just below the level of the mouths of the flame discharge openings 7 in the burner heads 6 by means of inwardly projecting lugs 17 on said wall and outstanding lugs 18 on the outer sides of said burner heads with its inner edge spaced outwardly therefrom to provide vertical secondary air passages 19 between said plate and said burner heads.

By the arrangement described, gas is supplied to the lower ends of the tubular body portions 5 of the circular series of burner heads 6 from the upper ends of the gas supply and supporting branch pipes 3 therefor and primary air enters the air inlet openings 8 at the lower ends of said tubular bodies and mixes with the gas flowing upwardly therethrough. The mixture of primary air and gas is ignited as it issues from the discharge openings 7 and the flames are directed from said opening at an upwardly and outwardly inclined angle between the vertically and horizontally spaced adjacent edges of the two deflector plates 11 and 16 without impinging thereon or on the furnace wall. At the same time, secondary air flows outwardly through the horizontal passages 12 between the tops of the burner heads 5 and the underside of the central deflector plate 11 and along the upper sides of the upwardly and outwardly inclined flames for the full length thereof. Secondary air also passes upwardly through the vertical passages 19 between the annular deflector plate 16 and the outer sides of the burner heads 6 and thence upwardly and outwardly along the undersides of the inclined burner flames. This arrangement provides an adequate supply of secondary air to the burner flames, prevents re-circulation of the combustion products around the burner flames and prevents impingement of the flames on furnace walls and deflector plates, thereby providing complete combustion of the gas and obtaining the maximum heating value thereof and preventing the formation of carbon monoxide gas.

Obviously, the hereinbefore described gas burner construction admits of considerable modification without departing from my invention. Therefore, I do not wish to be limited to the precise details shown and described.

What I claim is:

1. A multiple gaseous fuel burner comprising a group of upstanding Bunsen type burner units all having upwardly and outwardly inclined flame openings in their outer side faces and gas and primary air inlet openings below the level of said flame openings, a deflector plate closely adjacent and covering all of said burner units and spaced above the tops thereof and terminating at substantially the outer faces thereof to form therewith horizontal secondary air supply passages above the level of all of said flame openings, and a deflector plate surrounding said burner units and spaced horizontally from the outer side faces thereof to form therewith vertical secondary air supply passages below the level of said flame openings, whereby the outward flow of secondary air through said horizontal and vertical secondary air supply passageways prevents impingement of the flames from said upwardly and outwardly inclined flame openings on said deflector plates.

2. A multiple gaseous fuel burner comprising a group of upstanding Bunsen type burner units all having upwardly and outwardly inclined flame openings in their outer side faces and gas and primary air inlet openings below the level of said flame openings, a deflector plate covering all of said burner units and spaced above the tops thereof to form therewith horizontal secondary air supply passages above the level of all of said flame openings, and a deflector plate surrounding said burner units and spaced horizontally from the outer side faces thereof to form therewith vertical secondary air supply passages below the level of said flame openings, whereby the outward flow of secondary air through said horizontal and vertical secondary air supply passageway is adapted to prevent impingement of the flames from said upwardly and outwardly inclined flame openings on said deflector plates, said burner units having upstanding lugs at their tops arranged to position said first mentioned deflector plate both vertically and horizontally relative to said burner units and having lugs on their outer side faces arranged to afford support for said second mentioned deflector plate.

3. A multiple gaseous fuel burner comprising a plurality of upstanding Bunsen type burner units all having horizontally elongated heads at the tops thereof arranged in a circular series, said heads having upwardly and outwardly inclined longitudinal flame openings in their outer side faces, a deflector plate covering all of said burner heads and spaced above the tops thereof, and a deflector plate surrounding said heads below the level of said flame openings and spaced horizontally from the outer side faces of said heads, said heads having upstanding lugs thereon arranged to position said first mentioned deflector both horizontally and vertically relative thereto and having lugs on their outer side faces arranged to support said second mentioned deflector plate.

4. A Bunsen type gaseous fuel burner comprising an upright tubular portion with gas and primary air inlet openings adjacent to the bottom thereof, a hollow horizontally elongated head at the top thereof and an upwardly inclined longitudinal flame opening in one side face of said head, a deflector plate supported on said head closely adjacent and covering the burner unit and spaced above the top thereof and terminating at substantially the flame opening side face of the head to form therewith a horizontal secondary air supply passage above said flame opening, and a deflector plate supported on said head spaced horizontally from the flame opening side face of said head to form therewith a vertical secondary air supply passage below said flame opening.

*5. A multiple gaseous fuel burner adapted for arrangement within the enclosing wall of the combustion chamber of a furnace and comprising a group of individual upstanding Bunsen type burner units each having an outwardly directed side face having a flame discharge opening adjacent only the upper end thereof, each burner unit having a gas and primary air inlet therein into at its lower end, a deflector plate substantially covering the space between the rears of all of said burner units of said group and with its outer peripheral edge terminating sufficiently closely adjacent said discharge openings to form therewith horizontally directed secondary air passages above the level of all of said discharge openings, and a second deflector plate encircling the outer periphery of said group of burner units and of an horizontal area adapted to extend inwardly substantially from said enclosing wall of said combustion chamber and having an inner terminal edge spaced horizontally from said units and below said flame discharge openings to form with said burner units vertical secondary air supply passages that are below the level of said flame openings, whereby the flow of secondary air prevents impingement of the flames from their openings onto both of said deflector plates.*

*6. A multiple gaseous fuel burner adapted for arrangement within the enclosing wall of the combustion chamber of a furnace and comprising a group of individual upstanding Bunsen type burner units each having an outwardly directed side face and with a flame discharge opening through said outer face adjacent only the upper end thereof, each said burner unit having an inlet thereinto at its lower end for gas and primary air, a substantially imperforate deflector plate substantially covering all of the space between the rears of all of said burner units and*

*with its outer peripheral edge terminating sufficiently closely adjacent said discharge openings to form therewith horizontally directed secondary air passages above the level of all of said flame openings, and a second substantially imperforate deflector plate encircling the outer periphery of said group of burner units and of an horizontal area adapted to extend inwardly substantially from said enclosing wall of said combustion chamber and having an inner terminal edge spaced horizontally from said units and below said flame openings to form with said burner units vertical secondary air supply passages that are below the level of said flame openings, whereby the flow of secondary air prevents impingement of flames from their openings onto both of said deflector plates.*

CHARLES A. BROWN.

References Cited in the file of this patent or the original patent

UNITED STATES PATENTS

| Number | Name | Date |
|---|---|---|
| 649,193 | Betts | May 8, 1900 |
| 895,998 | Fling | Aug. 11, 1908 |
| 1,088,559 | Farquhar | Feb. 24, 1914 |
| 1,956,857 | Cunningham | May 1, 1934 |
| 1,981,349 | Dodge | Nov. 20, 1934 |
| 2,190,768 | Bryant | Feb. 20, 1940 |

FOREIGN PATENTS

| Number | Country | Date |
|---|---|---|
| 361,396 | France | Aug. 17, 1906 |